United States Patent [19]

Vandivier

[11] Patent Number: 5,610,971
[45] Date of Patent: Mar. 11, 1997

[54] DUAL KEYPAD TELEPHONE HANDSET FOR MOBILE COMMUNICATIONS

[75] Inventor: Karl D. Vandivier, Kokomo, Ind.

[73] Assignee: Delco Electronics Corporaiton, Kokomo, Ind.

[21] Appl. No.: 359,175

[22] Filed: Dec. 19, 1994

[51] Int. Cl.⁶ ................................................ H04M 11/00
[52] U.S. Cl. .......................... 379/58; 379/428; 379/433; 455/90
[58] Field of Search ................................ 379/58, 59, 61, 379/428, 433; 455/89, 90, 95, 99; 341/22; 345/1, 4

[56] References Cited

U.S. PATENT DOCUMENTS

| | | |
|---|---|---|
| 3,792,205 | 2/1974 | O'Dea . |
| 4,646,344 | 2/1987 | Goldhorn et al. .......................... 379/58 |
| 5,151,946 | 9/1992 | Martensson ................................ 379/38 |
| 5,173,936 | 12/1992 | Ditzig ........................................ 379/440 |

OTHER PUBLICATIONS

Best Two–Line Cordless Telephone, TWA Sky Mall Catalog, Early Spring 1995.

*Primary Examiner*—Curtis Kuntz
*Assistant Examiner*—G. J. Oehling
*Attorney, Agent, or Firm*—Jimmy L. Funke

[57] ABSTRACT

A telephone for mobile application affords hands-free operation when the handset is seated in a cradle and hand-held operation when removed from the cradle. The two modes are automatically sensed by a reed switch in the handset operated by a magnet in the cradle. The back of the handset, which is accessible when in the cradle, contains a back keypad and a back display, and the front of the handset contains a front keypad and a front display along with a microphone and an earpiece. When the reed switch senses hands-free mode only the back keypad and display are enabled, along with an external speaker and microphone. When hand-held mode is sensed, the front keypad, display and audio functions are enabled.

4 Claims, 2 Drawing Sheets

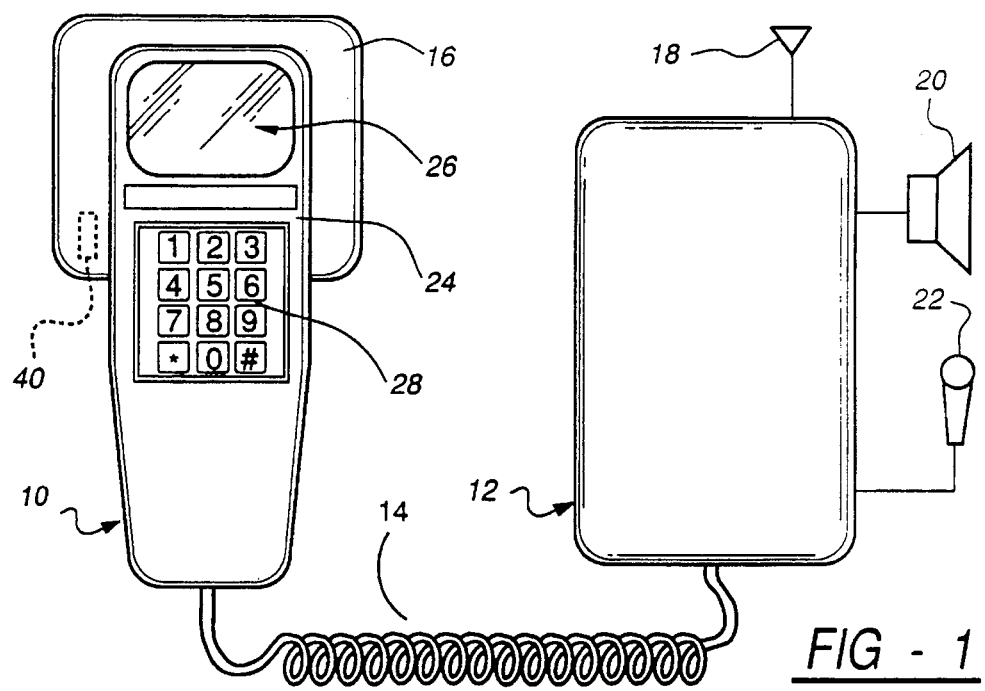
FIG - 1
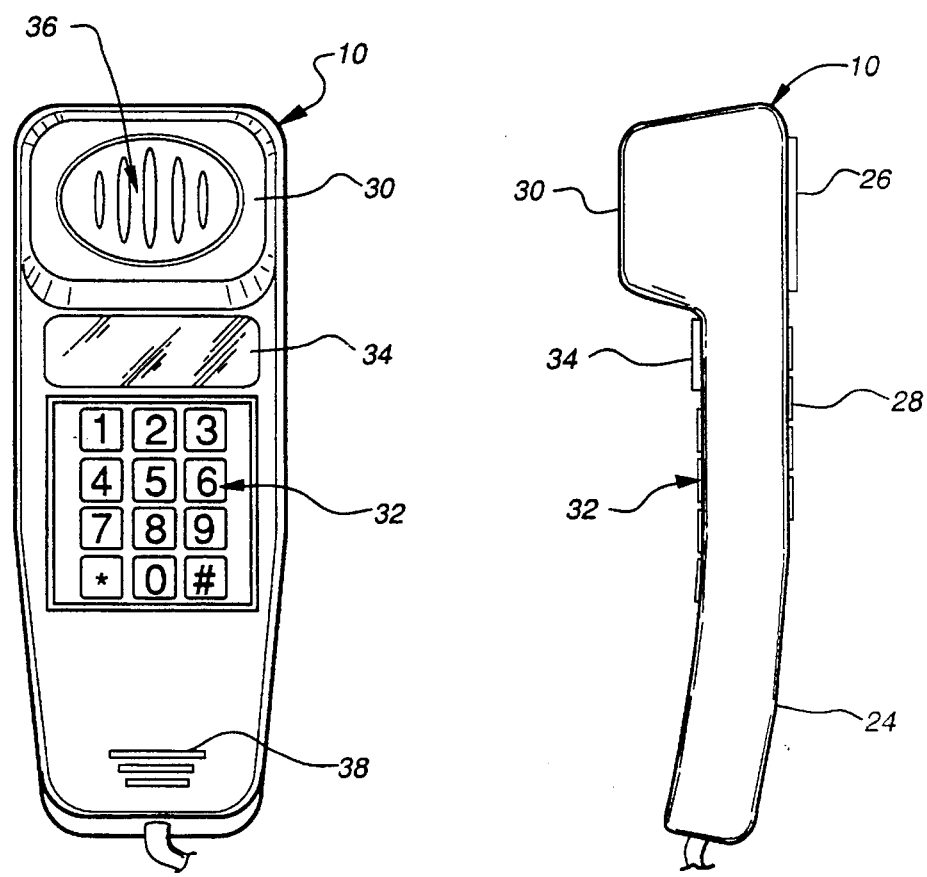
FIG - 2
FIG - 3

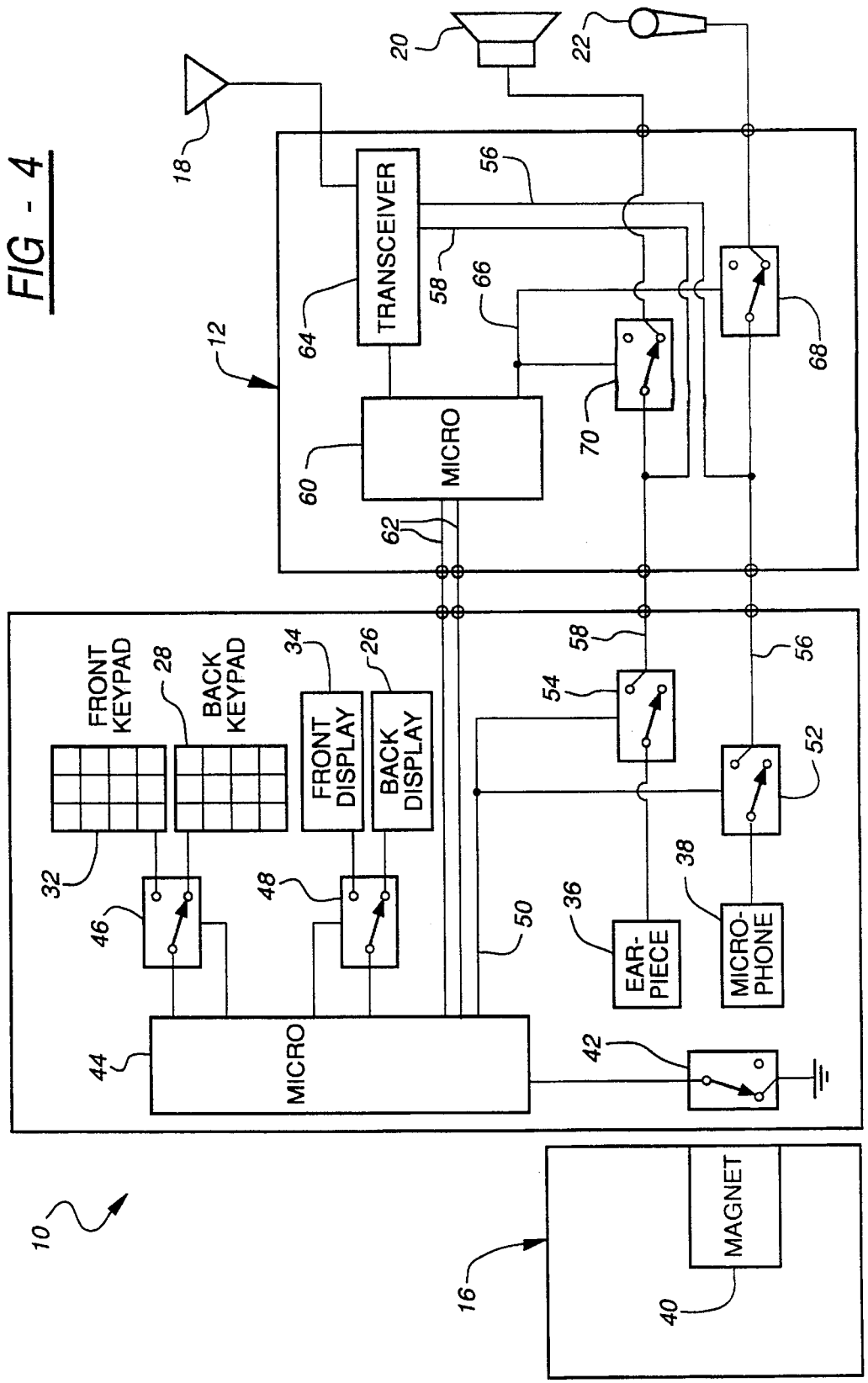

DUAL KEYPAD TELEPHONE HANDSET FOR MOBILE COMMUNICATIONS

FIELD OF THE INVENTION

This invention relates to telephones and particularly to telephones for alternative use in hand-held and hands-free modes.

BACKGROUND OF THE INVENTION

Telephones for use in automotive vehicles such as cellular telephones commonly have a handset which rests in a cradle during standby conditions and may remain in the cradle during use in a hands-free mode. A base or transmitter/receiver is connected to the handset by a cord (or even by a radio coupling) and contains or is connected to a speaker and a microphone for use during hands-free operation. The cradle and base may be separate or integrated in a single unit. The handset, of course, contains its own speaker or earpiece and microphone for use in the hand-held mode.

Commonly, the handsets for such application have either of two configurations. First, the earpiece and microphone are on the front of the handset, which faces down in the cradle, and a keypad and display are located on the back of the handset. This arrangement is convenient for use in the hands-free mode since the keypad faces up (or out) for easy use by the operator. Attendant difficulties with the first configuration is that when the handset is used in the hand-held mode the keypad is subject to being pushed by accident, and the handset must be shifted in position or to another hand to operate the keypad or to see the display. The second configuration has the keypad and display on the front of the handset. This is easy to use in the hand-held mode but for hands-free operation the keys and display are face down in the cradle and are not readily visible or accessible for operation.

SUMMARY OF THE INVENTION

It is therefore an object of the invention to achieve convenient keypad operation and display visibility for both hand-held and hands-free operation of a telephone. Another object is to avoid accidental key operation when a handset is hand-held.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a view of a mobile telephone showing the back of a handset in a cradle, according to the invention;

FIG. 2 is a front view of the handset of FIG. 1;

FIG. 3 is a side view of the handset of FIGS. 1 and 2; and

FIG. 4 is a schematic diagram of the telephone of FIG. 1 according to the invention.,

DESCRIPTION OF THE INVENTION

The ensuing description is directed to a mobile telephone for use in a radio communication system such as a cellular phone system, however it should be recognized that the principle of the invention is applicable as well to any telephone having a keypad on the handset and operable in both hand-held and hands-free modes.

Referring to FIG. 1, a telephone set includes a handset 10 connected to a base 12 by a cord 14, and a cradle 16 for holding the handset 10. The cradle is shown as separate from the base 12, but they may be integrated into a common housing. The base 12 includes a transceiver for radio communication via an antenna 18, and is connected to an external speaker 20 and an external microphone 22. Alternatively, the speaker and microphone may be incorporated into the base.

The back 24 of the handset 10 contains a display 26 and a keypad 28, both for use when the handset is seated in the cradle 16 for hands-free operation. In that condition the speaker 20 and the microphone 22 are energized for audio output and input. The front 30 of the handset 10, shown in FIG. 2, contains a keypad 32, a display 34, an earpiece 36 and a microphone 38. The front 30 is accessible when the handset is removed from the cradle 16, and in that condition the keypad 32, the display 34, the earpiece 36 and the 5 microphone 38 are energized for hand-held operation. Thus, as best depicted by FIG. 3, the handset has keypads 28 and 32, and displays 26 and 34 on its back and front, respectively.

The front and back keypads and other operations are mutually exclusive in operation. The back keypad 28 and display 26 along with the external speaker 20 and microphone 22 are enabled only when the handset 10 is in the cradle 16, and the front keypad 32 and display 34 and audio elements 36 and 38 are enabled only when the handset 10 is removed from the cradle 16. The front and back functions are automatically switched when the handset is removed from or replaced in the cradle.

FIG. 4 schematically shows the system including the switching arrangement. A magnet 40, concealed in the cradle 16 operates on a reed switch 42 or other magnetically operated switch which is in the handset 10 and located within the effective field of the magnet when the handset is in the cradle. Alternatively, magnet 40 could be located in the headset 10 and switch 42 could be located in the cradle 16, or any other switching arrangement known in the art could be used to provide an indication to microcontroller 44 that the handset 10 is either in or out of the cradle 16. Accordingly, the magnet holds the switch 42 in hands-free position when the handset is in the cradle, and releases the switch to a hand-held position when the handset is removed from the cradle. A microcontroller 44 in the handset is connected to the switch 42 and responds to the switch state by operating other switches for hand-held and hands-free operation. A keypad switch 46 operated according to the state of the switch 42 alternatively connects the front keypad 32 and the back keypad 28 to the microcontroller to transmit key data. A display switch 48 operated according to the state of the switch 42 alternatively connects the front display 34 and the back display 26 to the microcontroller to transmit display data. Line 50 carries an audio control signal from the microcontroller 44 to switches 52 and 54 which selectively couple or decouple the microphone 38 and an audio output line 56, and the earpiece 36 and an audio input line 58. The switches 46, 48, 52 and 54 are operated in accordance with the state of the switch 42 such that when in the hand-held mode the front keypad 32, the front display 34, the earpiece 36 and the microphone 38 are enabled, and for the hands-free mode they are disabled.

The base 12 includes a microcontroller 60 which is coupled by data lines 62 to the microcontroller 44 to receive the mode state information. A transceiver 64 is connected to the antenna 18 and to audio input line 56 and to audio output line 58. The microcontroller 60 has an audio control line 66 subject to the mode state signal and coupled to a switch 68 and a switch 70 for connecting the external microphone 22 and the speaker 20, respectively, to the audio input line 56 and the audio output line 58. Thus the speaker 20 and the microphone 22 are controlled via the audio control signal to be enabled only when the switch 42 is in hands-free mode, and the back keypad 28 and the back display 26 will be enabled at the same time.

Thus it will be recognized that the provision of separate front and back keypads and displays, which are automatically enabled according to whether the handset is seated in the cradle, improves the convenience of using keypads in both hand-held and hands-free mode, and at the same time prevents transmission of data due to inadvertent pressing on the back keypad when hand-held.

The embodiments of the invention in which an exclusive property or privilege is claimed are defined as follows:

1. A telephone having a base and a handset coupled to the base for alternative use as a hand-held instrument and as a hands-free instrument comprising:

a cradle for holding the handset during standby intervals and during hands-free operation;

the handset having a back which faces outwardly when the handset is installed on the cradle and a front which faces the cradle;

the back of the handset including a back keypad and a back display for hands-free phone operation;

the front of the handset including a front keypad and front display for hand-held operation;

a proximity switch on the handset and a switch operator on the cradle for operating the switch between a hand-held state and a hands-free state when the handset is removed from and returned to the cradle respectively; and a controller responsive to the switch and coupled to the back and front keypads for enabling only the back keypad and back display when the switch is in the hands-free state and enabling only the front keypad and front display when the switch is in the hand-held state.

2. The invention as defined in claim 1 wherein:

the handset includes an ear-piece and a first microphone;

the base is coupled to a speaker and a second microphone;

audio control means responsive to the switch and coupled to the ear piece, the first and second microphones and the speaker for enabling the ear piece and the first microphone when the switch is in the hand-held state and the speaker and the second microphone when the switch is in the hands-free state.

3. The invention as defined in claim 1 wherein:

both the handset and the base have audio input and output means;

the controller includes means for enabling the handset audio input and output means when the switch is in the hand-held state; and the base includes control means coupled to the controller and to the base audio input and output means for enabling the base audio input and output means when the switch is in the hands-free state.

4. A telephone having a base and a handset coupled to the base for alternative use as a hand-held instrument and as a hands-free instrument comprising:

a cradle for holding the handset during standby intervals and during hands-free operation;

the handset having a back which faces outwardly when the handset is installed on the cradle and a front which faces the cradle;

the back of the handset including a back keypad and a back display for hands-free phone operation;

the front of the handset including a front keypad and front display for hand-held operation; and means for enabling only the back keypad and back display for hands-free operation when the handset is installed on the cradle and for enabling only the front keypad and front display for hand-held operation when the handset is removed from the cradle.

* * * * *